(12) United States Patent
Ono et al.

(10) Patent No.: US 7,012,663 B2
(45) Date of Patent: Mar. 14, 2006

(54) LIQUID CRYSTAL DISPLAY ELEMENT, AND USE OF PHASE DIFFERENCE FILM USED THE SAME FOR

(75) Inventors: Yuhei Ono, Tokyo (JP); Akihiko Uchiyama, Tokyo (JP)

(73) Assignee: Teijin Limited, Osaka (JP)

(*) Notice: Subject to any disclaimer, the term of this patent is extended or adjusted under 35 U.S.C. 154(b) by 11 days.

(21) Appl. No.: 10/468,224

(22) PCT Filed: Oct. 3, 2002

(86) PCT No.: PCT/JP02/10324

§ 371 (c)(1),
(2), (4) Date: Aug. 18, 2003

(87) PCT Pub. No.: WO03/032060

PCT Pub. Date: Apr. 17, 2003

(65) Prior Publication Data

US 2004/0239852 A1    Dec. 2, 2004

(30) Foreign Application Priority Data

Oct. 9, 2001  (JP) ............................. 2001-311099

(51) Int. Cl.
*G02F 1/1335* (2006.01)

(52) U.S. Cl. ...................... 349/118; 349/117; 349/118; 349/119

(58) Field of Classification Search ......... 349/117–121
See application file for complete search history.

(56) References Cited

U.S. PATENT DOCUMENTS 5,805,253 A * 9/1998 Mori et al. ................. 349/118
6,724,452 B1 * 4/2004 Takeda et al. .............. 349/139

FOREIGN PATENT DOCUMENTS

| EP | 1 045 261 | * 10/2000 |
| JP | 3-233404 A | 10/1991 |
| JP | 2000-111728 A | 4/2000 |
| JP | 2001-42127 A | 2/2001 |
| JP | 2001-42128 A | 2/2001 |
| JP | 2001-42365 A | 2/2001 |
| JP | 2001-249222 A | 9/2001 |

OTHER PUBLICATIONS

Patent Abstracts of Japan, Publication No.: JP-A-11-095208, Liquid Crystal Display Device and Film for Visual Field Angle Compensation Used for the Same, Publication Date: Apr. 9, 1999, Applicant: Sumitomo Chem Co Ltd.
Patent Abstracts of Japan, Publication No.: JP-A-2000-131693, Liquid Crystal Display Device, Publication Date: May 12, 2000, Applicant: Fujitsu Ltd.

* cited by examiner

*Primary Examiner*—Dung T. Nguyen
*Assistant Examiner*—(Nancy) Thanh-Nhan P. Nguyen
(74) *Attorney, Agent, or Firm*—Sughrue Mion, PLLC

(57) ABSTRACT

The present invention provides a liquid crystal display device of VA mode having decreased leakage of light over a wide range and giving a clear and almost achromatic black display by using a retardation film A having smaller retardation with shorter wavelength in combination with a retardation film C having larger retardation with shorter wavelength. Accordingly, a high-quality liquid crystal display device having excellent picture quality can be produced by the present invention.

14 Claims, 6 Drawing Sheets

```
┌────────┐
│        │  1P
└────────┘

┌────────┐
│        │  A
└────────┘

┌────────┐
│        │  L
└────────┘

┌────────┐
│        │  C
└────────┘

┌────────┐
│        │  2P
└────────┘

┌────────┐
│        │  B
└────────┘
```

1P

A

L

C

2P

B

1P

A

C

L

2P

B

1P

C

L

A

2P

B

1P

L

C

A

2P

B

1P

C

A

L

2P

B

1P

L

A

C

2P

B

LIQUID CRYSTAL DISPLAY ELEMENT, AND USE OF PHASE DIFFERENCE FILM USED THE SAME FOR

TECHNICAL FIELD

The present invention relates to a liquid crystal display device of vertical orientation mode to orient the major axis of the liquid crystal molecule nearly perpendicular to the panel face the liquid crystal cell in a state free from the application of voltage.

BACKGROUND TECHNOLOGY

Liquid crystal display device is generally composed mainly of a liquid crystal cell having a liquid crystal layer sandwiched between a pair of substrates, a retardation film and a pair of polarizing films arranged perpendicular to each other and placed at both sides of the liquid crystal cell. Liquid crystal display devices have been used in wide fields from small-sized instruments such as watch and electronic calculator to large-sized instruments such as monitor and television set. Elements of TN (Twisted Nematic) mode to use a liquid crystal molecule having positive dielectric anisotropy were the mainstream in such liquid crystal display devices. In a TN-mode liquid crystal display device, the orientation direction of the liquid crystal molecule adjacent to one substrate is twisted by about 90° relative to the orientation direction of the liquid crystal molecule adjacent to the other substrate in a state free from the application of voltage.

Various developments were performed on the TN-mode liquid crystal display devices for realizing good black display and high contrast. It is necessary in the TN mode to display the black color under the application of voltage, i.e. orient the major axis of the liquid crystal molecule in the direction nearly perpendicular to the panel face. However, since the liquid crystal molecule adjacent to a liquid crystal panel substrate keeps horizontal orientation in the TN mode even under the application of voltage, the polarized state of light varies by the birefringence of the liquid crystal molecule. Consequently, complete black color cannot be displayed even by viewing the panel from perpendicular direction to make the realization of high contrast difficult.

On the contrary, in a liquid crystal display device of vertical orientation mode, so-called VA (vertical aligned) mode, the major axis of a liquid crystal molecule is oriented nearly perpendicular to the panel face in a state free from the application of voltage between a pair of substrates constituting the liquid crystal panel. In the vertical aligned mode, the liquid crystal molecule adjacent to the liquid crystal panel substrate also takes a nearly perpendicular orientation relative to the panel face and, accordingly, the polarization state of the light is scarcely varied by the transmission of the light through a liquid crystal layer. Consequently, a nearly complete black display superior to TN mode usually becomes possible to realize high contrast when the cell is viewed perpendicular to the substrate.

Various techniques have been proposed for improving the view angle of conventional VA mode display. For example, the specification of the JP-A 11-95208 (hereunder JP-A means "Japanese Unexamined Patent Publication) describes a vertical aligned nematic liquid crystal display device composed of a liquid crystal cell, a pair of polarizing films placed above and below the liquid crystal cell in a state directing the absorbing axes of the films perpendicular to each other, and a retardation film for the compensation of view angle composed of one or two retardation films placed between the liquid crystal cell and at least one of the polarizing films. Concretely disclosed technique is the use of one retardation film or two laminated retardation films placed between the liquid crystal cell and one of the polarizing films (refer to the claim 1 and the Examples 1 to 4 (sections 0030 to 0034).

The specification of JP-A 2000-131Σdiscloses a VA-mode liquid crystal display device produced by inserting a specific biaxial retardation film between a substrate and a polarizing film in a manner to direct the slow axis in the plane of the retardation film to be nearly parallel or perpendicular to the absorption axis of said polarizing film placed at the side of the retardation film relative to the liquid crystal layer. Concretely, a lamination of two specific retardation films (refer to section 0064, FIG. 54) or two specific retardation films placed at both sides of a liquid crystal cell (section 0070, FIG. 60) are described in the specification.

However, the VA mode liquid crystal display devices described in these specifications were successful for the improvement of the view angle characteristics only at a specific wavelength. In other words, the transmission of the light of a specific wavelength is decreased by slantly viewing the liquid crystal display device displaying black color resulting in the widening of the view angle. However, a problem of the coloring of black color owing to the leakage of light occurs in these cases when the wavelength of the light is different from the specific wavelength.

The main object of the invention is to provide a new liquid crystal display device of VA mode.

Another object of the invention is to provide a VA mode liquid crystal display device causing little leakage of light over the whole visible light range in the case of displaying black color and enabling the display of nearly achromatic black color.

A further object of the invention is to provide a new method for suppressing the light leakage over the whole visible light range to enable the display of nearly achromatic black color by using a retardation film in a VA mode liquid crystal display device in the case of displaying black color.

Still further objects and advantages of the invention will become apparent from the following explanation.

DISCLOSURE OF THE INVENTION

The inventors of the present invention have found that the problem of the coloring of black color by the light leakage is dependent on the wavelength dispersion of the transmission light and supposed that the above problem is caused by the use of a retardation film capable of improving the view angle characteristics only at a specific wavelength resulting in the leakage of light at different wavelengths. Based on the above conception, the inventors of the present invention have paid attention to the wavelength dispersion characteristics of the retardation in the retardation film, and the present invention have been accomplished by the finding that the control of the wavelength dispersion characteristics is important and that the combined use of a plurality of specific retardation films is effective.

According to the present invention, the objects and advantages of the present invention are achieved by a liquid crystal display device composed of a liquid crystal cell having a pair of substrates and a liquid crystal sandwiched between the substrates and orienting the major axis of the liquid crystal molecule nearly perpendicular to the face of the substrate in a state free from the application of voltage, a 1st and a 2nd polarizing films placed at both sides of the liquid crystal cell and having polarizing axes nearly perpendicular to each other and at least two retardation films (A,C) placed between the liquid crystal cell and the 1st and 2nd polarizing films, wherein the retardation film A satisfies the following formula (1) and/or (2)

$$R(\lambda_1)/R(\lambda_2)<1 \quad (1)$$

$$K(\lambda_1)/K(\lambda_2)<1 \quad (2)$$

in the formulas (1) and (2), $R(\lambda_1)$ and $R(\lambda_2)$ are each an in-plane retardation at wavelength of $\lambda_1$ and $\lambda_2$ and $K(\lambda_1)$ and $K(\lambda_2)$ are each a retardation in the direction of the thickness of the retardation film at wavelength of $\lambda_1$ and $\lambda_2$, and $\lambda_1$ and $\lambda_2$ are wavelengths satisfying the formula 400 nm<$\lambda_1$<$\lambda_2$<700 nm, and the retardation film C satisfies the following formulas (3) and (4)

$$n_x \geq n_y > n_z \quad (3)$$

$$1 < K(\lambda_1)/K(\lambda_2) \quad (4)$$

in the formulas, $n_x$ is the maximum refractive index in the plane of the retardation film, $n_y$ is the refractive index in the direction perpendicular to the direction of the maximum refractive index in the plane of the retardation film and $n_z$ is the refractive index in the normal line direction of the retardation film, and the definitions of K, $\lambda_1$ and $\lambda_2$ are same as those described above.

EXPLANATION OF THE SIGNS

Figure 1:
FIG. 1 is an example of the constitution of the liquid crystal display device of the present invention.
Figure 1:
Figure 1:
Figure 1:
Figure 1:
Figure 1:

1P: The first polarizing film
A: The retardation film A
L: The VA liquid crystal cell
C: The retardation film C
2P: The second polarizing film
B: Backlight

BEST MODE FOR CARRYING OUT THE INVENTION

The liquid crystal cell of vertical aligned mode (a VA mode liquid crystal cell) of the present invention has a structure holding a pair of substrates each having an electrode and placed opposite to each other interposing a definite distance therebetween provided that at least one of the substrate with electrode is transparent and holding liquid crystal molecules between the substrates directing the major axis of the molecule in a direction nearly perpendicular to the substrate in a state free from the application of voltage. The orientation in a nearly perpendicular direction means that the average value of the angles between the substrate and the major axis of the liquid crystal molecules at the displaying pixel is nearly perpendicular, generally 80 degrees or more, more preferably 85 degrees or more and further preferably 87 degrees or more. The liquid crystal may be oriented parallel to the substrate at a part other than the displaying pixel in a state free from the application of voltage as disclosed in JP-A 2001-235750.

A phenomenon of the failure in getting uniform display takes place in a liquid crystal cell of VA mode by the inclination of liquid crystal molecules in various azimuthal directions under the application of voltage to randomly form discontinuous orientation parts, so-called discrenation, simply by perpendicularly orienting the liquid crystal between parallel substrates. Various studies have been made on the discrenation phenomenon. There are reports to control the inclination angle of the liquid crystal molecule under the application of voltage by forming protrusions on the substrate as described in SID98DIGEST, (1998) p.1081 "A Wide Viewing Angle Polymer Stabilized Homeotropic Aligned LCD" and Display 99 Late newspapers, (1999) p.31 "A Wide Viewing Angle Back Side Exposure MVA TFT LCD with Novel Structure and Process" or forming a window on the pixel electrode as described in JP-A 7-199190. A reverse TN system is also proposed in the Sharp Technical Journal No.80, 2001.8, p.11 "Development of ASV-LCD Using Continuous Pinwheel Alignment (CPA) mode" in which the liquid crystal molecule is fallen under twisting in the application of voltage by adding a chiral material to the liquid crystal. As stated above, there are many orientation states of liquid crystal of a liquid crystal cell of vertical aligned mode under the application of voltage, however, the present invention is not restricted by the orientation state of the liquid crystal under the application of voltage.

The retardation along the thickness direction of a liquid crystal cell at 550 nm wavelength (hereinafter referred to as K(550)) is usually set to be fallen within the range of from –400 nm to –200 nm or thereabout for example in a transmission-type liquid crystal display device. The retardation along the thickness direction is defined by the product of the distance of the substrates holding the liquid crystal and the refractive index anisotropy of the liquid crystal perpendicular to the substrate.

The liquid crystal display device of the present invention, for example a transmission-type liquid crystal display device is usually provided with a backlight at the side reverse to the viewing side and has the first and second polarizing films above and below the liquid crystal cell in a state to cross the transmission axes of the films at an angle nearly perpendicular to each other.

Figure 2:
FIG. 2 is an example of the constitution of the liquid crystal display device of the present invention.
Figure 2:
Figure 2:
Figure 2:
Figure 2:
Figure 2:
Figure 3:
FIG. 3 is an example of the constitution of the liquid crystal display device of the present invention.
Figure 3:
Figure 3:
Figure 3:
Figure 3:
Figure 3:
Figure 4:
FIG. 4 is an example of the constitution of the liquid crystal display device of the present invention.
Figure 4:
Figure 4:
Figure 4:
Figure 4:
Figure 4:
Figure 5:
FIG. 5 is an example of the constitution of the liquid crystal display device of the present invention.
Figure 5:
Figure 5:
Figure 5:
Figure 5:
Figure 5:
Figure 6:
FIG. 6 is an example of the constitution of the liquid crystal display device of the present invention.
Figure 6:
Figure 6:
Figure 6:
Figure 6:
Figure 6:
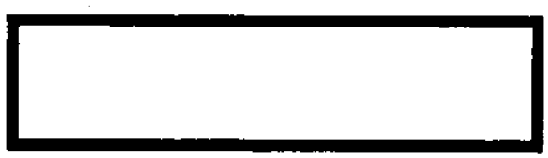

The positional relationship of the retardation film and the polarizing film is characterized by the disposition of at least one of the retardation film films A and C between the liquid crystal cell and the first polarizing film and/or between the liquid crystal cell and the second polarizing film Examples of concrete arrangement are shown in the FIGS. 1 to 6.

The retardation film A is preferably placed adjacent to the first or the second polarizing film for effectively compensating the apparent deviation of the axes of the polarizing films. The retardation film C is preferably placed adjacent to the liquid crystal cell for effectively compensating the thickness-direction retardation of the liquid crystal cell. The term "adjacent to" used in the present invention means that both components are directly contacting with each other by pasting for example with an adhesive agent.

Preferably, the slow axis of the retardation films A and/or C is placed essentially parallel or perpendicular to the polarizing axis of the 1st and/or 2nd polarizing films to suppress the impartment of retardation on the polarized light entering from the front. A pair of other retardation films having nearly equal characteristics (for example, a λ/4 plate) may be placed between the liquid crystal cell and the 1st polarizing film and between the liquid crystal cell and the 2nd polarizing film in a manner to direct the slow axis of the retardation films essentially parallel or perpendicular to each other.

It is preferable that the retardation films A and C have in-plane retardations at 550 nm wavelength (hereinafter referred to as R(550)) of 300 nm or under and K(550) values of 400 nm or under, however, the optimum values are dependent upon the average refractive indices (hereinafter referred to as "n") of the retardation films A and C and the combination and arrangement of the retardation films A and C.

In the present invention, the in-plane retardation $R(\lambda)$ and the thickness direction retardation $K(\lambda)$ of the retardation film are expressed by the following formulas (12) and (13), respectively.

$$R=(n_x-n_y) \times d \tag{12}$$

$$K=\{(n_x+n_y)/2-n_z\} \times d \tag{13}$$

in the formulas, $n_x$, $n_y$ and $n_z$ are each a three-dimensional refractive index of the retardation film corresponding to the refractive indices in the x axis and y axis in the film plane and the z axis perpendicular to the film, respectively, and d is the thickness (nm) of the retardation film. λ is wavelength of from 400 to 700 nm.

Namely, the terms $n_x$, $n_y$ and $n_z$ are indices showing the optical anisotropy of a retardation film. Especially in the case of the retardation film of the present invention, $n_x$: the maximum refractive index in the film plane, $n_y$: the refractive index in the direction perpendicular to the direction of the maximum refractive index in the film plane.

$n_z$: the refractive index in the direction of the normal line of the film.

The optically anisotropy is defined to be positive when the refractive index is maximum in the drawing direction in the case of uniaxial drawing of a polymer film or in the drawing direction to get higher increase of the orientation degree in the case of biaxial drawing, i.e. the orientation direction of the polymer main chain from the viewpoint of chemical structure, and is defined to be negative when the above refractive index in the drawing direction becomes minimum. The three-dimensional refractive index is measured in the present invention by a method to assume the optical anisotropy of the retardation film as an optical indicatrix and determine the three-dimensional refractive index by a known formula of optical indicatrix. The three-dimensional refractive index depends upon the wavelength of the light source for the measurement and, accordingly, it is preferable to be defined at the wavelength of the light source. The retardation films are classified in the present invention by the optical characteristics and called as follows.

Retardation film A: $n_x > n_y \approx n_z$
Retardation film C: $n_x \geq n_y > n_z$.

At least two retardation films, namely the retardation film A and the retardation film C are used in combination in the present invention. The retardation film A has a retardation essentially decreasing with shorter wavelength of the light for measurement and, on the contrary, the retardation of the retardation film C essentially increases with the shortening of the wavelength the light for measurement.

The above problems can be solved by the combination of such two specific kinds of retardation films and the reason is supposed as follows. The retardation film A mainly compensates the apparent deviation of the axis of the polarizing plate and the retardation film C compensates the retardation in the thickness direction generating between a pair of polarizing films. It is preferable to apply an equal angle of retardation (deg) to the polarized light independent of the wavelength for compensating the apparent deviation of the axis of the polarizing plate over a wide wavelength range. In other words, the retardation becomes smaller at the shorter wavelength when the retardation is expressed by nm. On the other hand, the retardation film preferably has the wavelength dispersion of retardation similar to that of the VA cell in order to compensate the retardation in the thickness direction generating between a pair of polarizing films over a wide wavelength range. A TAC film having optical anisotropy, etc., is practically used as a protecting layer of a polarizing film in addition to the VA liquid cell between a pair of polarizing films, however, the thickness direction retardation of the VA liquid crystal cell is sufficiently large compared the protecting layer. Accordingly, it is preferable that the retardation film has a wavelength dispersion of retardation similar to that of the VA cell, i.e. a retardation increasing with decreasing wavelength, for compensating the thickness direction retardation between a pair of polarizing films over a wide wavelength range.

Accordingly, the retardation film A has a wavelength dispersion characteristics of the retardation satisfying the following formulas (1) and/or (2) preferably in single layer.

$$R(\lambda_1)/R(\lambda_2)<1 \tag{1}$$

$$K(\lambda_1)/K(\lambda_2)<1 \tag{2}$$

In other words, retardations (R,K) of the film in the plane and/or thickness direction of the retardation film become smaller at shorter wavelength. It is necessary for the improvement of the view angle characteristics to use the retardation film A composed essentially of a single layer, i.e. a single film without laminating a plurality of retardation films other than the retardation film A for satisfying the above requirements and the use of a single film is advantageous from the view point of cost and productivity. As to be mentioned later, the retardation film A may contain a small amount of a liquid crystal for slightly controlling the above characteristics.

In the above formulas, $\lambda_1$ and $\lambda_2$ are arbitrary wavelengths satisfying the following formula (14)

$$400 \text{ nm} < \lambda_1 < \lambda_2 < 700 \text{ nm} \tag{14}$$

The retardation film A preferably satisfies the following formulas (1-1) and/or (1-2).

$$R(450)/R(550)<1 \tag{1-1}$$

$$K(450)/K(550)<1 \tag{1-2}$$

The compensation over a wide wavelength is made to be possible by the use of a retardation film A having a wavelength dispersion characteristics satisfying the following formulas (5) and/or (6).

$$1<R(650)/R(550) \tag{5}$$

$$1<K(650)/K(550) \tag{6}$$

The definitions of R and K are same as those mentioned above.

The retardation film A preferably further has a wavelength dispersion characteristics satisfying the following formulas (10) and (11)

$$0.6 < R(450)/R(550) < 0.97 \quad (10)$$

$$1.01 < R(650)/R(550) < 1.4 \quad (11)$$

and the compensation of the apparent deviation of axis of the polarizing plate can be improved by setting the retardation ratio to be closer to the ratio of the wavelengths for measurement.

The retardation film A preferably satisfies the following formula (7).

$$10 < R(550) < 300 \quad (7)$$

The retardation film C to be used in the present invention satisfies the following formulas (3) and (4) (preferably the formulas (4-1) and/or (4-2)) at the same time.

$$n_x \geq n_y > n_z \quad (3)$$

$$1 < K(\lambda_1)/K(\lambda_2) \quad (4)$$

$$K(650)/K(550) < 1 \quad (4\text{-}1)$$

$$1 < K(450)/K(550) \quad (4\text{-}2)$$

Namely, the retardation film C is usually a biaxially drawn film having a refractive index $n_z$ in the thickness direction of the film smallest among the refractive indices. It has larger retardation K in thickness direction at shorter wavelength.

The retardation film C preferably satisfies the following formula (8) to effectively compensate the retardation in thickness direction of the liquid crystal cell.

$$50 < K(550) < 400 \quad (8)$$

Furthermore, the retardation film C preferably satisfies the following formula (9) to prevent the hindering of the effect of the film A compensating the deviation of the axis of the polarizing plate.

$$R(550) < 30 \quad (9)$$

Especially in the present invention, the use of the retardation film A satisfying the above formula (7) and the retardation film C satisfying the above formula (8) is suitable for the compensation of the deviation of the axis of the polarizing plate and the compensation of the retardation in the thickness direction of the liquid crystal cell.

When each of the 1st and the 2nd polarizing films in the liquid crystal display device of the present invention are composed of a polarizing device having protecting layers on both sides as mentioned later, the above retardation films A and C are preferably used to give the sum of the thickness-direction retardations of one side of the protection layers, the retardation films A and C and the liquid crystal cell of from −200 to +200 nm. When other retardation films are used in addition to the retardation films A and C, the retardation films A and C are preferably used to get the sum of thickness-direction retardations including these additional retardation films of from −200 to +200 nm.

The retardation film A to be used in the present invention is e.g. the one described in the specification of WO 00/26705 (corresponding to the specification of EP 1045261).

Concretely, an oriented polymer film satisfying the following conditions (a) or (b) can be used as the retardation film A.

(a) An oriented polymer film satisfying the requirements of (1) composed of a polymer containing a monomer unit of a polymer having positive refractive index anisotropy (hereinafter referred to as the first monomer unit) and a monomer unit of a polymer having negative refractive index anisotropy (hereinafter referred to as the second monomer unit), (2) having the R(450)/R(550) ratio of the polymer derived from the first monomer unit smaller than the R(450)/R(550) ratio of the polymer derived from the second monomer unit and (3) having positive refractive index anisotropy, and (b) an oriented polymer film satisfying the requirements of (1) composed of a polymer containing a monomer unit forming a polymer having positive refractive index anisotropy (hereinafter referred to as the first monomer unit) and a monomer unit forming a polymer having negative refractive index anisotropy (hereinafter referred to as the second monomer unit), (2) having the R(450)/R(550) ratio of the polymer derived from the first monomer unit larger than the R(450)/R(550) ratio of the polymer derived from the second monomer unit and (3) having negative refractive index anisotropy.

Examples of the films satisfying the conditions of (a) or (b) are those satisfying the following conditions (c) or (d).

(c) An oriented polymer film satisfying the requirements of (1) composed of a polymer blend composed of a polymer having positive refractive index anisotropy and a polymer having negative refractive index anisotropy and/or a copolymer composed of a monomer unit of a polymer having positive refractive index anisotropy and a monomer unit of a polymer having negative refractive index anisotropy, (2) having the R(450)/R(550) ratio of the polymer having positive refractive index anisotropy smaller than the R(450)/R(550) ratio of the polymer having negative refractive index anisotropy and (3) having positive refractive index anisotropy, and (d) an oriented polymer film satisfying the requirements of (1) composed of a polymer blend composed of a polymer having positive refractive index anisotropy and a polymer having negative refractive index anisotropy and/or a copolymer composed of a monomer unit of a polymer having positive refractive index anisotropy and a monomer unit of a polymer having negative refractive index anisotropy, (2) having the R(450)/R(550) ratio of the polymer having positive refractive index anisotropy larger than the R(450)/R(550) ratio of the polymer having negative refractive index anisotropy and (3) having negative refractive index anisotropy.

The polymer having positive or negative refractive index anisotropy means a polymer giving an oriented polymer film having positive or negative refractive index anisotropy.

The concrete materials of the oriented polymer film are explained below.

These polymer materials are often heated in molding and, accordingly, preferable to have excellent heat resistance according to the use and the glass transition temperature of the material is preferably 120° C. or above, more preferably 140° C. or above. When the glass transition temperature is lower than 120° C., problems such as the relaxation of orientation may occur according to the use conditions of the display element.

The water absorption of the polymer material is preferably 1% by weight or less. A polymer material having a water absorption exceeding 1% by weight may have problems of the change in optical properties or the dimensional change in the practical use as a retardation film. The water absorption of the polymer material is preferably 0.5% by weight or less.

There is no particular restrictions on the polymer material constituting such oriented polymer film, and the preferable materials are those having excellent heat-resistance and good optical properties and formable by solution film-forming method, for example, thermoplastic polymers such as polyarylates, polyesters, polycarbonates, polyolefins, polyethers, polysulfones and polyether sulfones.

As mentioned above, the thermoplastic polymer to be used in the above film is more preferably polymer blends (a mixture of two or more kinds of polymers) composed of a polymer having a positive refractive index anisotropy and a polymer having a negative refractive index anisotropy or a copolymer composed of a monomer unit of a polymer having a positive refractive index anisotropy and a monomer unit of a polymer having a negative refractive index anisotropy. The thermoplastic polymer may be a combination of two or more kinds of polymer blends or copolymers or a combination of one or more kinds of polymer blends and one or more kinds of copolymers.

The polymer blend is preferably a compatible blend or a blend of polymers having nearly equal refractive indices to attain optical transparency. Concrete examples of the combination of polymer blend are, for example, a combination of a poly(methyl methacrylate) as a polymer having negative optical anisotropy with at least one kind of polymer selected from poly(vinylidene fluoride), poly(ethylene oxide) and poly(vinylidene fluoride-co-trifluoroethylene) as a polymer having positive optical anisotropy, a combination of a poly (phenylene oxide) as a polymer having positive optical anisotropy with at least one kind of polymer selected from polystyrene, poly(styrene-co-lauroylmaleimide), poly(styrene-co-cyclohexylmaleimide) and poly(styrene-co-phenylmaleimide) as a polymer having negative optical anisotropy, a combination of a poly(styrene-co-maleic anhydride) having negative optical anisotropy with a polycarbonate having positive optical anisotropy, a combination of a poly(acrylonitrile-co-butadiene) having positive optical anisotropy with a poly(acrylonitrile-co-styrene) having negative optical anisotropy and a combination of a polycarbonate having positive optical anisotropy with a polycarbonate having negative optical anisotropy, and the present invention is not restricted by the above combinations. Especially preferable polymer blend is a blend of a polycarbonate having positive optical anisotropy with a polycarbonate having negative optical anisotropy from the viewpoint of transparency.

Examples of the copolymer are poly(butadiene-co-polystyrene), poly(ethylene-co-polystyrene), poly(acrylonitrile-co-butadiene), poly(acrylonitrile-co-butadiene-co-styrene), polycarbonate copolymers, polyester copolymers, polyester carbonate copolymers and polyarylate copolymers. Especially preferable copolymers are polycarbonate copolymers, polyester copolymers, polyester carbonate copolymers, polyarylate copolymers or the like having fluorene skeleton because a segment having fluorene skeleton can impart negative optical anisotropy.

Among the above examples, polycarbonate copolymers or polymer blends of polycarbonates are especially preferable owing to excellent transparency, heat-resistance and productivity. The polycarbonate is preferably an aromatic polycarbonate containing a structure having a fluorene skeleton. For example, the polycarbonate contains the recurring unit expressed by the following formula (A).

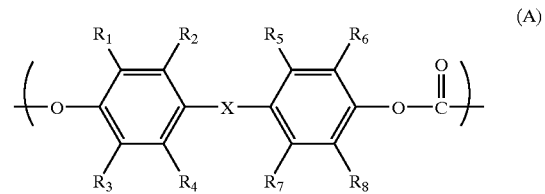
(A)

In the formula (A), $R_1$ to $R_8$ are each independently at least one kind of atom or group selected from hydrogen atom, halogen atoms and hydrocarbon groups having a carbon number of from 1 to 6. Examples of the hydrocarbon groups are alkyl groups such as methyl group, ethyl group, isopropyl group and cyclohexyl group and aryl groups such as phenyl group. Hydrogen atom and methyl group are especially preferable among the above atoms and groups.

X is a fluorene group expressed by the following formula.

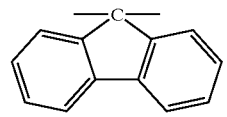

The amount of the recurring unit expressed by the above formula (A) is preferably 1 to 99 mol %, more preferably 30 mol % or more based on the total recurring units.

The above aromatic polycarbonate is preferably a copolymer and/or a polymer blend composed of 30 to 90 mol % recurring unit (a) expressed by the above formula (A) and 70 to 10 mol % recurring unit (b) expressed by the following formula (B) based on the total recurring units.

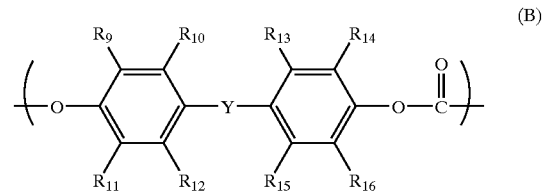
(B)

In the above formula (B), $R_9$ to $R_{16}$ are each independently an atom or group selected from hydrogen atom, halogen atoms and hydrocarbon groups having a carbon number of from 1 to 22. Examples of the hydrocarbon group having a carbon number of from 1 to 22 are alkyl groups having a carbon number of from 1 to 9 such as methyl group, ethyl group, isopropyl group and cyclohexyl group or aryl groups such as phenyl group, biphenyl group and terphenyl group. Hydrogen atom and methyl group are especially preferable among the above atoms and groups.

The group Y in the above formula (B) is expressed by the following formulas.

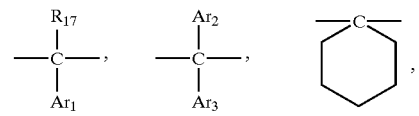

-continued

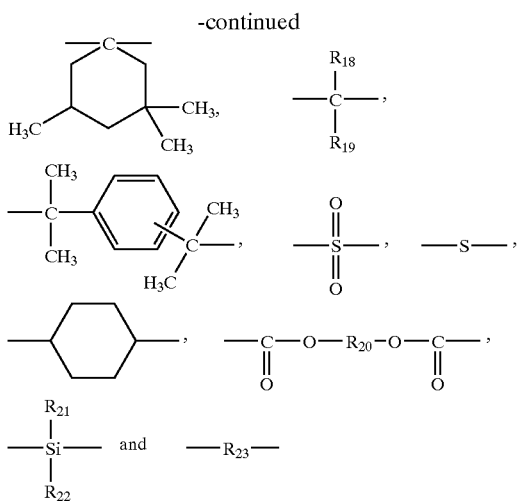

In the formulas, the groups $R_{17}$ to $R_{18}$, $R_{21}$ and $R_{22}$ are each independently selected from hydrogen atom, halogen atoms and hydrocarbon groups having a carbon number of from 1 to 22. Examples of the hydrocarbon groups are same as those cited above. The groups $R_{20}$ and $R_{23}$ are each independently selected from hydrocarbon groups having a carbon number of from 1 to 20 and the examples of the hydrocarbon groups are same as those cited above. $Ar_1$ to $Ar_3$ are each independently an aryl group having a carbon number of from 6 to 10, such as phenyl group and naphthyl group.

The content of the recurring unit of the formula (A) is preferably from 35 to 85 mol %, more preferably from 45 to 80 mol % based on the total recurring units.

The content of the recurring unit of the formula (A) is dependent upon the required wavelength dispersion characteristics of retardation especially when the groups $R_1$ to $R_8$ in the formula (A) are hydrogen atoms or a part of the groups are methyl group and the groups $R_9$ to $R_{16}$ in the formula (B) are hydrogen atoms and Y is isopropylene group. The lower limit of the content is 45 mol %, preferably 50 mol %, more preferably 55 mol %. The upper limit is 80 mol %, preferably 75 mol %, more preferably 70 mol %. Especially preferable range of the content is from 55 to 70 mol %.

The above copolymer of the aromatic polycarbonate may be a combination of two or more each of the recurring units of the formula (A) and formula (B) and the polymer blend may be a combination of two or more each of the above recurring units.

The molar ratio can be determined on the bulk polycarbonate constituting the oriented polymer film irrespective of a copolymer or a polymer blend by a nuclear magnetic resonance (NMR) instrument, etc.

The copolymers and polymer blends can be produced by conventional methods. Suitable processes for the production of polycarbonates are the polycondensation of a dihydroxy compound with phosgene, the melt polycondensation process, etc. Blending of two or more mutually compatible polycarbonates by melt mixing, etc., is preferable in the case of producing a polymer blend, however, the light scattering between the components can be suppressed to improve the transparency even in a blend of components which are not completely compatible with each other by setting the refractive indices of the components to coincide with each other.

The intrinsic viscosity of the aromatic polycarbonate is preferably from 0.3 to 2.0 dl/g. When the intrinsic viscosity is smaller than 0.3, the polymer becomes brittle to lose the mechanical strength. A polymer having an intrinsic viscosity exceeding 3.0 has problems of the generation of die line, etc., in the solution film-forming process and the difficulty in the purification after the completion of polymerization owing to its excessively high solution viscosity.

Preferably, the retardation film C of the present invention also has excellent heat resistance similar to the retardation film A and the glass transition temperature of the polymer material constituting the film C is 120° C. or over, preferably 140° C. or over. When the glass transition temperature is lower than 120° C., problems such as the relaxation of orientation may occur according to the use conditions of the display element.

The water absorption is also preferably 1% by weight or below.

There is no particular restrictions on the polymer material, and the examples of the material are thermoplastic polymers such as polyarylates, polyesters, polycarbonates, polyolefins, polyethers, polysulfones and polyether sulfones.

Materials having excellent heat resistance and transparency, good optical performance and formable by solution film forming process are preferable among the above examples. Examples of the preferable materials are aromatic polycarbonates and polyolefins.

The retardation film of the present invention is preferably transparent and preferably has a haze value of 3% or less and a total light transmittance of 85% or above.

The retardation film of the present invention may be incorporated with an ultraviolet absorber such as phenylsalicylic acid, 2-hydroxybenzophenone and triphenyl phosphate, a bluing agent to vary the color tone, an antioxidant, etc.

The retardation film of the present invention is produced by conventional melt-extrusion method, solution casting method, etc. The solution casting method is more preferable from the viewpoint of the uniformity of film thickness, the appearance of the film, etc. Concretely, in the case of using a polycarbonate as the polymer material, the polycarbonate is dissolved in an organic solvent such as methylene chloride or dioxolane and an undrawn film is produced by solution casting method. The produced undrawn film is uniaxially or biaxially drawn by a conventional method to obtain a retardation film having a desired retardation.

Examples of the drawing method to form a retardation film A are continuous drawing methods such as a longitudinal uniaxial roll drawing method to draw a film taking advantage of the speed difference between rolls, a longitudinal uniaxial tenter drawing method to hold the lateral edges of a film with pins or clips and drawing the film taking advantage of the difference of the speed of the holding parts of the tenter in the flow direction of the film and a lateral uniaxial tenter drawing method to expand a tenter in lateral direction, and the longitudinal uniaxial roll drawing method is preferable among the above methods from the viewpoint of the uniformity of the film characteristics, etc.

Examples of the drawing method for the production of a retardation film C are a consecutive biaxial drawing method to draw the film separately in longitudinal and lateral directions by the above-mentioned uniaxial drawing method, a simultaneous biaxial drawing method to laterally expand a tenter having speed difference in the flow direction of the film, a multi-stage drawing method to repeat the above drawing procedure several times.

Several examples of continuous drawing methods for producing a retardation film were shown above, however, the drawing method of the retardation film of the present invention is not restricted by the examples. Although continuous drawing is preferable from the viewpoint of productivity, the film is not necessarily produced by the continuous drawing method.

In the case of drawing the film by a technique represented by the above drawing methods, the film may be incorporated with a conventional plasticizers to improve the drawability. Examples of the plasticizers are phthalic acid esters such as dimethyl phthalate, diethyl phthalate and dibutyl phthalate, phosphoric acid esters such as tributyl phosphate, aliphatic dibasic acid esters, glycerol derivatives and glycol derivatives. The organic solvent used in the above-mentioned film-forming process may be present in the film at the drawing process. The amount of the organic solvent left in the film is preferably 1 to 20% by weight based on the solid component of the polymer.

The above additives such as plasticizers and liquid crystals can vary the wavelength dispersion of the retardation of the retardation film and the addition amount of the additive is preferably 10% by weight or less, more preferably 3% by weight or less based on the solid component of the polymer, that is the weight of the polymer material constituting the retardation film.

The thickness of the retardation film of the present invention is preferably from 1 $\mu$m to 300 $\mu$m. The expression of retardation film used in the present invention includes all "films" and "sheets".

The retardation film C may be a film produced by fixing a liquid crystalline polymer on a substrate (a drawn or undrawn film) in oriented state as well as a film produced by drawing a polymer material. The substrate is preferably the retardation film A from the viewpoint of the film thickness.

As mentioned above, the chemical structure of the polymer constituting the oriented polymer film is important for decreasing the retardation of a retardation film A at shorter wavelength. Although the wavelength dispersion of retardation is mostly determined by the chemical structure, it is necessary to pay attention to the fact that the dispersion is also dependent on the film-forming conditions, additives, drawing conditions, blended state, molecular weight, etc.

Conventional polarizing films can be used as the polarizing film of the present invention. Examples of the polarizing film is a film produced by dispersing iodine or a dichroic dye, etc., in a polymer (called also as a binder polymer) such as polyvinyl alcohol and orienting and fixing at least the iodine, etc., by the drawing, etc., of the film and a film produced by drawing a main chain type or a side chain type polyacetylene. A polarizing film produced by using a polyvinyl alcohol as the binder polymer is usually laminated with a cellulose acetate film, etc., as a protecting film. The polarizing film may be used in the form laminated with such protecting film or by using the retardation film of the present invention as a substitute for the protecting film without using the above protecting film.

The thickness of the polarizing film is usually from 30 to 300 $\mu$m for a film produced by using the above binder polymer. In the case of a film having a dichroic liquid crystal material oriented and fixed to the film by coating, the thickness is about 0.01 to 30 $\mu$m.

The liquid crystal display device of the present invention is a combination of a retardation film, a VA-mode liquid crystal cell containing a liquid crystal panel substrate and a polarizing film. The retardation film and the polarizing film are preferably used in a state adjacent to each other, namely, closely contacting with each other. The close contact of the members can be achieved by using conventional adhesives.

A backlight may be placed at the opposite side (back side) of the liquid crystal cell of the liquid crystal display device of the present invention. In this case, various optical films such as a prism sheet or a light-scattering film may be placed between the liquid crystal display device and the backlight.

The present invention can be in a liquid crystal display, a liquid crystal projector, etc., and is extremely useful especially as a liquid crystal display device of vertical aligned mode necessitating a wide view angle.

Preferable examples of the constitution of the liquid crystal display device of the present invention provided with a backlight are shown in the FIG. 1 to FIG. 6, which do not restrict the constitution of the present invention.

Preferably, either one of the polarizing films is placed adjacent to the retardation film as shown in the FIGS. 1 to 4;

In these examples, the retardation film A may be used as a single sheet or as a laminate of a plurality of the retardation films A. Similarly, the film C may be replaced with a laminate of a plurality of the films C. In the case of laminating a plurality of films, the directions of the retardation films having the largest refractive index, that is, the directions of the optical axes are preferably aligned. Furthermore, the element may be a reflection type or semi-transmitting reflection type liquid crystal display device having a reflection plate or a semi-transmitting reflection plate as the backlight and the polarizing film of the backlight side.

The preferable embodiment of the present invention is described below.

The preferable embodiment of the present invention is a liquid crystal display device composed of a liquid crystal cell holding a VA liquid crystal between a pair of substrates in a state directing the major axis of the liquid crystal molecule nearly perpendicular to the substrate face in the absence of voltage, a 1st and a 2nd polarizing films placed at both sides of the liquid crystal cell and having polarizing axes nearly perpendicular to each other and at least two retardation films (A,C) placed between the liquid crystal cell and the polarizing films, wherein the retardation film A satisfies the following formula (10) and/or (11) in the form of a single sheet $$0.6 < R(450)/R(550) < 0.97 \tag{10}$$

$$1.01 < R(650)/R(550) < 1.4 \tag{11},$$

the retardation film C satisfies the following formula (3) and formulas (4-1) and/or (4-2)

$$n_x \geq n_y > n_z \tag{3}$$

$$K(650)/K(550) < 1 \tag{4-1}$$

$$1 < K(450)/K(550) \tag{4-2},$$

the retardation film A is placed adjacent to the 1st polarizing film or the 2nd polarizing film, the retardation film C is placed adjacent to the liquid crystal cell, the slow axis of the retardation film A is placed parallel or perpendicular to the polarizing axis of the 1st polarizing film, the retardation film A satisfies the following formula (7)

$$10 < R(550) < 300 \tag{7},$$

the retardation film C satisfies the following formula (8)

$$50 < K(550) < 400 \tag{8}$$

and the formula (9)

$$R(550) < 30 \tag{9}$$

and the retardation film A contains a polycarbonate having a fluorene skeleton. The definitions of R, K, $n_x$, $n_y$ and $n_z$ in the above formulas are same as those described above.

Accordingly, it has been cleared by the present invention that a liquid crystal display device of VA mode having decreased leakage of light over the whole visible light range and giving a clear and almost achromatic black display can be produced by using the retardation film A in combination with the retardation film C of the present invention.

The present invention provides a method for compensating the view angle of a liquid crystal display device over the whole visible light range by providing a liquid crystal cell holding a liquid crystal between a pair of substrates in a state directing the major axis of the liquid crystal molecule nearly perpendicular to the substrate face in the absence of voltage, a 1st and a 2nd polarizing films placed at both sides of the liquid crystal cell and having polarizing axes nearly perpendicular to each other and at least two retardation films (A, C) placed between the liquid crystal cell and the 1st and 2nd polarizing films, wherein the polarizing film A satisfies the following formula (1) and/or (2)

$$R(\lambda_1)/R(\lambda_2) < 1 \tag{1}$$

$$K(\lambda_1)/K(\lambda_2) < 1 \tag{2}$$

and the retardation film C satisfies the following formulas (3) and (4) at the same time.

$$n_x \geq n_y > n_z \tag{3}$$

$$1 < K(\lambda_1)/K(\lambda_2) \tag{4}$$

In the above formulas (1) and (2), $R(\lambda_1)$ and $R(\lambda_2)$ are each an in-plane retardation or the retardation film at wavelength of $\lambda_1$ and $\lambda_2$, $K(\lambda_1)$ and $K(\lambda_2)$ are each a thickness-direction retardation of the retardation film at wavelength of $\lambda_1$ and $\lambda_2$ and $\lambda_1$ and $\lambda_2$ are wavelengths satisfying the formula 400 nm $< \lambda_1 < \lambda_2 <$ 700 nm.

The term $n_x$ is the maximum refractive index in the film plane, $n_y$ is the refractive index in the direction perpendicular to the direction of the maximum refractive index in the film plane and $n_z$ is the refractive index in the direction of the normal line of the film. The definitions of K, $\lambda_1$ and $\lambda_2$ are same as those described above.

The present method, i.e. the concrete method for applying the above retardation film A and the retardation film C to a liquid crystal display device of VA mode will be apparent from the above explanations.

The present invention further provides a combination of the retardation film A satisfying the following formula (1) and/or formula (2)

$$R(\lambda_1)/R(\lambda_2) < 1 \tag{1}$$

$$K(\lambda_1)/K(\lambda_2) < 1 \tag{2}$$

with the retardation film C satisfying the following formulas (3) and (4)

$$n_x \geq n_y > n_z \tag{3}$$

$$1 < K(\lambda_1)/K(\lambda_2) \tag{4}$$

for the use as a retardation film (viewing angle compensation film) of a liquid crystal display device of VA mode.

The definitions of R, K, $n_x$, $n_y$ and $n_z$ in the formulas are same as those described above.

The use of the films, i.e. the concrete use for applying the above retardation film A and the retardation film C to a liquid crystal display device of VA mode will be apparent from the above explanations.

Effect of the Invention

As described above, the present invention can provide a VA mode liquid crystal display device causing decreased leakage of light over the whole visible light range and enabling the display of a clear and nearly achromatic black color by combining a retardation film A having smaller retardation at shorter wavelength with a retardation film C having larger retardation at shorter wavelength. Accordingly, the view angle can be widened over the whole visible light range.

EXAMPLES

The present invention is explained in more detail by the following examples, which do not restrict the scope of the present invention.

(Evaluation Methods)

The properties, etc., of the materials described in the specification were determined by the following evaluation methods.

(1) Determination of Retardation R in In-Plane Direction and Retardation K in Thickness Direction The retardation R in in-plane direction and the retardation K in thickness direction were determined by the Spectroscopic Ellipsometer "M150" (product of JASCO Corp.). The R value was measured in a state to cross the incident light with the film surface at right angle. The K value was determined by measuring the retardation values at various angles by varying the angle between the incident light and the film surface and determining the three-dimensional refractive indices $n_x$, $n_y$ and $n_z$ by the curve fitting with a known formula of refractive index ellipsoid. The average refractive index n necessary as another parameter in the above procedure is measured by an Abbe refractometer (Abbe Refractometer 2-T product of ATAGO Co., Ltd.).

(2) Determination of Water Absorption

The water absorption was determined in conformity with the "Determination of Water Absorption and Boiling Water Absorption of Plastics" described in JIS K 7209 except for the use of a film having a film thickness of 130±50 μm in dried state. The size of the test piece was 50 mm square. The sample was immersed in water at 25° C. for 24 hours and the variation of the weight was measured. The result was expressed by % by weight.

(3) Determination of the Glass Transition Temperature (Tg) of the Polymer

The glass transition temperature was measured by "DSC2920 Modulated DSC" (product of TA Instruments). The measurement was carried out not on a film but in the form of flakes or chips after the production of the polymer.

(4) Determination of the Film Thickness

The thickness of the film was measured by an electronic micrometer manufactured by Anritsu Corp.

(5) Determination of the Copolymerization Ratio of the Polymer

The copolymerization ratio was measured by a proton NMR "JNM-alpha600" (product of JEOL Ltd.). Especially in the case of a copolymer of bisphenol A and biscresol fluorene, deuterobenzene was used as the solvent and the ratio was calculated from the proton intensity ratio of each methyl group.

(6) Polymerization of Polycarbonate Copolymer

The monomer structures for the production of the polycarbonate used in the Examples are shown below.

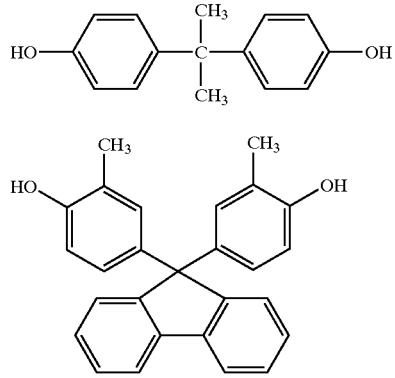

[X]

[Y]

An aqueous solution of sodium hydroxide and ion-exchanged water were charged in a reactor furnished with a stirrer, a thermometer and a reflux condenser, the monomers X and Y having the above structures were dissolved in the solution at a molar ratio of 33:∂and a small amount of hydrosulfite was added to the system. Methylene chloride was added thereto and phosgene was blown into the reactor at 20° C. spending about 60 minutes. The content of the reactor was emulsified by adding p-tert-butylphenol, triethylamine was added to the emulsion and the product was stirred at 30° C. for about 3 hours to complete the reaction. After the completion of the reaction, the organic phase was collected and methylene chloride was evaporated to obtain a polycarbonate copolymer. The compositional ratio of the obtained copolymer was nearly equal to the charging ratio of the monomers.

Example 1

The polycarbonate copolymer produced by the above method was dissolved in methylene chloride to obtain a dope solution having a solid concentration of 18% by weight. A cast film was prepared from the dope solution on a substrate by solution casting method. The film was peeled off from the substrate and dried by slowly raising the temperature to Tg-20° C. The produced dried film was uniaxially drawn at 230° C. at a draw ratio of 1.6 to obtain a film A (copolymer PC1). It has been confirmed that the film has smaller retardation at shorter wavelength for measurement and has positive refractive index anisotropy.

ARTON manufactured by JSR Ltd. was dissolved in methylene chloride to produce a dope solution having a solid concentration of 18% by weight. A cast film was prepared from the dope solution by a method similar to the method described above and biaxially drawn at 175° C. at draw ratios of 1.3 in longitudinal and lateral directions to obtain a retardation film C (ARTON1). The film was confirmed to have larger retardation at shorter wavelength for measurement.

A VA liquid crystal cell having the characteristics shown in the following Table 1 was prepared and laminated with a commercially available iodine-type polarizing film (HLC2-5618, product of Sanritz Corp.) and the above retardation film with an adhesive to form the constitution shown in the following Table 2. There was little leakage of light by viewing the obtained panel in slant direction at any angle and the leaked light was colorless.

TABLE 1

| | |
|---|---|
| n (550) | 1.504 |
| d (μm) | 4 |
| R (450) (nm) | 0 |
| R (550) (nm) | 0 |
| R (650) (nm) | 0 |
| K (450) (nm) | −325 |
| K (550) (nm) | −310 |
| K (650) (nm) | −305 |

TABLE 2

| Example 1 | Example 2 | Comparative Example 1 |
|---|---|---|
| 1st Polarizing Film (Transmission axis 90°) | 1st Polarizing Film (Transmission axis 90°) | 1st Polarizing Film (Transmission axis 90°) |
| PC copolymer 1 (Slow axis 90°) | PC copolymer 2 (Slow axis 90°) | ARTON2 (Slow axis 90°) |
| Liquid crystal cell ARTON1 | Liquid crystal cell PC1 | Liquid crystal cell ARTON3 |
| 2nd Polarizing Film (Transmission axis 0°) | 2nd Polarizing Film (Transmission axis 0°) | 2nd Polarizing Film (Transmission axis 0°) |
| Backlight | Backlight | Backlight |

Example 2

A bisphenol A polycarbonate (C1400; product of Teijin Chemicals Ltd.) was dissolved in methylene chloride to obtain a dope solution having a solid concentration of 18% by weight. A cast film was prepared from the dope solution by a method similar to the Example 1. The film was biaxially drawn at 165° C. at draw ratios of 1.1 in longitudinal and lateral directions to obtain a retardation film C (PC1). The film was confirmed to have larger retardation at shorter wavelength for measurement.

A panel constitution similar to that of the Example 1 except for the use of PC1 in place of ARTON1 was prepared. There was little leakage of light by viewing the obtained panel in slant direction at any angle to develop a nearly complete black color and the leaked light was colorless.

Comparative Example 1

ARTON (product of JSR) was dissolved in methylene chloride to obtain a dope solution having a solid concentration of 18% by. weight. A cast film was prepared from the dope solution and uniaxially drawn at 175° C. at a draw ratio of 1.4 to obtain a film A (ARTON2). Separately, the cast film was biaxially drawn at 175° C. at draw ratios of 1.3 in longitudinal and lateral directions to obtain a film C (ARTON3).

A panel constitution shown in the Table 2 was produced by using these films. The leakage of light was confirmed especially by viewing the panel from slant direction at an angle of 45° and the leaked light had a colored black color.

The optical characteristics of the retardation films used in the Examples and the Comparative Example are shown in the following Table 3.

TABLE 3

|  | PC copolymer 1 | ARTON 1 | PC1 | ARTON 2 | ARTON 3 |
|---|---|---|---|---|---|
| n (550) | 1.6240 | 1.5175 | 1.5875 | 1.5175 | 1.5175 |
| R (450) (nm) | 123 | 0 | 0 | 141 | 0 |
| R (550) (nm) | 150 | 0 | 0 | 140 | 0 |
| R (650) (nm) | 159 | 0 | 0 | 140 | 0 |
| K (450) (nm) | 62 | 222 | 270 | 71 | 212 |
| K (550) (nm) | 75 | 220 | 250 | 70 | 210 |
| K (650) (nm) | 80 | 219 | 245 | 70 | 209 |
| nx (550) | 1.6250 | 1.5182 | 1.5883 | 1.5184 | 1.5182 |
| ny (550) | 1.6235 | 1.5182 | 1.5883 | 1.5170 | 1.5182 |
| nz (550) | 1.6235 | 1.5160 | 1.5858 | 1.5170 | 1.5161 |
| Film thickness after drawing | 90 | 150 | 80 | 80 | 150 |
| Glass transition temperature (° C.) | 225 | 170 | 160 | 170 | 170 |
| Water absorption (wt. %) | 0.2 | 0.2 | 0.2 | 0.2 | 0.2 |

INDUSTRIAL APPLICABILITY

The present invention provides a liquid crystal display device of VA mode having decreased leakage of light over a wide range and displaying clear and almost achromatic black color by using at least two retardation films by combining a retardation film A having smaller retardation with shorter wavelength with a retardation film C having larger retardation with shorter wavelength. Accordingly, such liquid crystal display device can provide a high-quality liquid crystal display device having excellent picture quality.

The invention claimed is:

1. A liquid crystal display device composed of a liquid crystal cell containing a liquid crystal held between a pair of substrates in a state to orient a major axis of a liquid crystal molecule in a direction nearly perpendicular to the face of the substrate in the absence of applied voltage, a 1st and a 2nd polarizing films placed at both sides of the liquid crystal cell and having polarizing axes directing perpendicular to each other and at least two retardation films (A,C) placed between the liquid crystal cell and the polarizing films wherein the retardation film A satisfies the following formula (1) and/or (2)

$$R(\lambda_1)/R(\lambda_2)<1 \tag{1}$$

$$K(\lambda_1)/K(\lambda_2)<1 \tag{2}$$

(in the formulas (1) and (2), $R(\lambda_1)$ and $R(\lambda_2)$ are each an in-plane retardation at wavelength of $\lambda_1$ and $\lambda_2$, $K(\lambda_1)$ and $K(\lambda_2)$ are each a retardation of the retardation film in the direction of thickness at wavelength of $\lambda_1$ and $\lambda_2$, and $\lambda_1$ and $\lambda_2$ are wavelengths satisfying the relationship of 400 nm<$\lambda_1$<$\lambda_2$<700 nm), and the retardation film C satisfies the following formulas (3) and (4) at the same time:

$$n_x \geq n_y > n_z \tag{3}$$

$$1<K(\lambda_1)/K(\lambda_2) \tag{4}$$

(in the formulas, $n_x$ is a maximum refractive index in a plane of the retardation film, $n_y$ is a refractive index in a direction perpendicular to the direction of the maximum refractive index in the plane of the retardation film and $n_z$ is a refractive index in the normal line direction of the retardation film, and the definitions of K, $\lambda_1$ and $\lambda_2$ are same as those described above);
wherein the retardation film A satisfies the following formula (7)

$$10<R(550)<300 \tag{7}$$

and the retardation film C satisfies the following formula (8)

$$50<K(550)<400 \tag{8}$$

(in the formulas, the definitions of R and K are same as those described above).

2. A liquid crystal display device according to claim 1 wherein the retardation film A is placed adjacent to the 1st or the 2nd polarizing film.

3. A liquid crystal display device according to claim 1 wherein the retardation film C is placed adjacent to the liquid crystal cell.

4. A liquid crystal display device according to claim 1 wherein a slow axis of the retardation film A is parallel or perpendicular to the polarization axis of the polarizing film.

5. A liquid crystal display device according to claim 1 wherein the wavelength $\lambda_1$ is 450 nm and $\lambda_2$ is 550 nm.

6. A liquid crystal display device according to claim 1 wherein the retardation film A satisfies the following formula (5) and/or (6)

$$1<R(650)/R(550) \tag{5}$$

$$1<K(650)/K(5\ 50) \tag{6}$$

(in the formulas, R(650) and R(550) are the in-plane retardance of the retardation film at wavelengths of 650 nm and 550 nm, respectively, and K(650) and K(550) are the retardance of the retardation film in the direction of thickness at wavelengths of 650 nm and 550 nm, respectively).

7. A liquid crystal display device according to claim 1 wherein the retardation film C satisfies the following formula (4-1)

$$K(650)/K(550)<1 \tag{4-1}$$

(in the formula, the definition of K is the same as that described above).

8. A liquid crystal display device according to claim 1 wherein both of the retardation films A and C are made of a polymer material having a water absorption of 1% by weight or less.

9. A liquid crystal display device according to claim 1 wherein the retardation film A is composed of a single layer.

10. A liquid crystal display device according to claim 1 wherein the retardation film A is composed of an oriented polymer film composed of a monomer unit of a polymer having positive refractive index anisotropy and a monomer unit of a polymer having negative refractive index anisotropy.

11. A liquid crystal display device according to claim 10 wherein the retardation film A comprises a polycarbonate having a fluorene skeleton.

12. A liquid crystal display device according to claim 1 wherein the retardation film C satisfies the following formula (9)

$$R(550)<30 \tag{9}$$

(in the formula, the definition of R is same as that described above).

13. A liquid crystal display device according to claim 1 provided that, when both of the 1st and the 2nd polarizing films are composed of polarizing devices having protective layers on both sides, the sum of the retardations of one of the protecting layers, the retardation films A and C and the liquid crystal cell in the thickness direction at wavelength of 550 nm is from −200 nm to +200 nm.

14. A liquid crystal display device composed of a liquid crystal cell containing a liquid crystal held between a pair of substrates in a state to orient a major axis of a liquid crystal molecule in a direction nearly perpendicular to the face of the substrate in the absence of applied voltage, a 1st and a 2nd polarizing films placed at both sides of the liquid crystal cell and having polarizing axes directing perpendicular to each other and at least two retardation films (A,C) placed between the liquid crystal cell and the polarizing films wherein the retardation film A satisfies the following formulas (10) and (11) in a state of a single sheet, $$0.6 < R(450)/R(550) < 0.97 \tag{10}$$

$$1.01 < R(650)/R(550) < 1.4 \tag{11}$$

the retardation film C satisfies the following formula (3) and {(4-1) and/or (4-2)} at the same time, $$n_x \geq n_y > N_z \tag{3}$$

$$K(650)/K(550) < 1 \tag{4-1}$$

$$1 < K(450)/K(550) \tag{4-2}$$

the retardation film A is placed adjacent to the 1st polarizing film or the 2nd polarizing film, the retardation film C is placed adjacent to the liquid crystal cell, a slow axis of the retardation film A is parallel or perpendicular to the polarizing axis of the 1st polarizing film, the retardation film A satisfies the following formula (7), $$10 < R(550) < 300 \tag{7}$$

the retardation film C satisfies the following formula (8), $$50 < K(550) < 400 \tag{8}$$

and satisfies the following formula (9), $$R(550) < 30 \tag{9}$$

(in the formulas, R(450), R(550), and R(650) are the in-plane retardation of the retardation film at wavelengths of 450 nm, 550 nm and 650 nm, respectively, K(450), K(550) and K(650) are the retardation in thickness direction at 450 nm, 550 nm and 650 nm wavelengths, respectively, $n_x$ is a maximum refractive index in a plane of the retardation film, $n_y$ is a refractive index in a direction perpendicular to the direction of the maximum refractive index in the plane of the retardation film and $n_z$ is a refractive index in the normal line direction of the retardation film) and the retardation film A comprises a polycarbonate having a fluorene skeleton.

* * * * *